Figure 1:
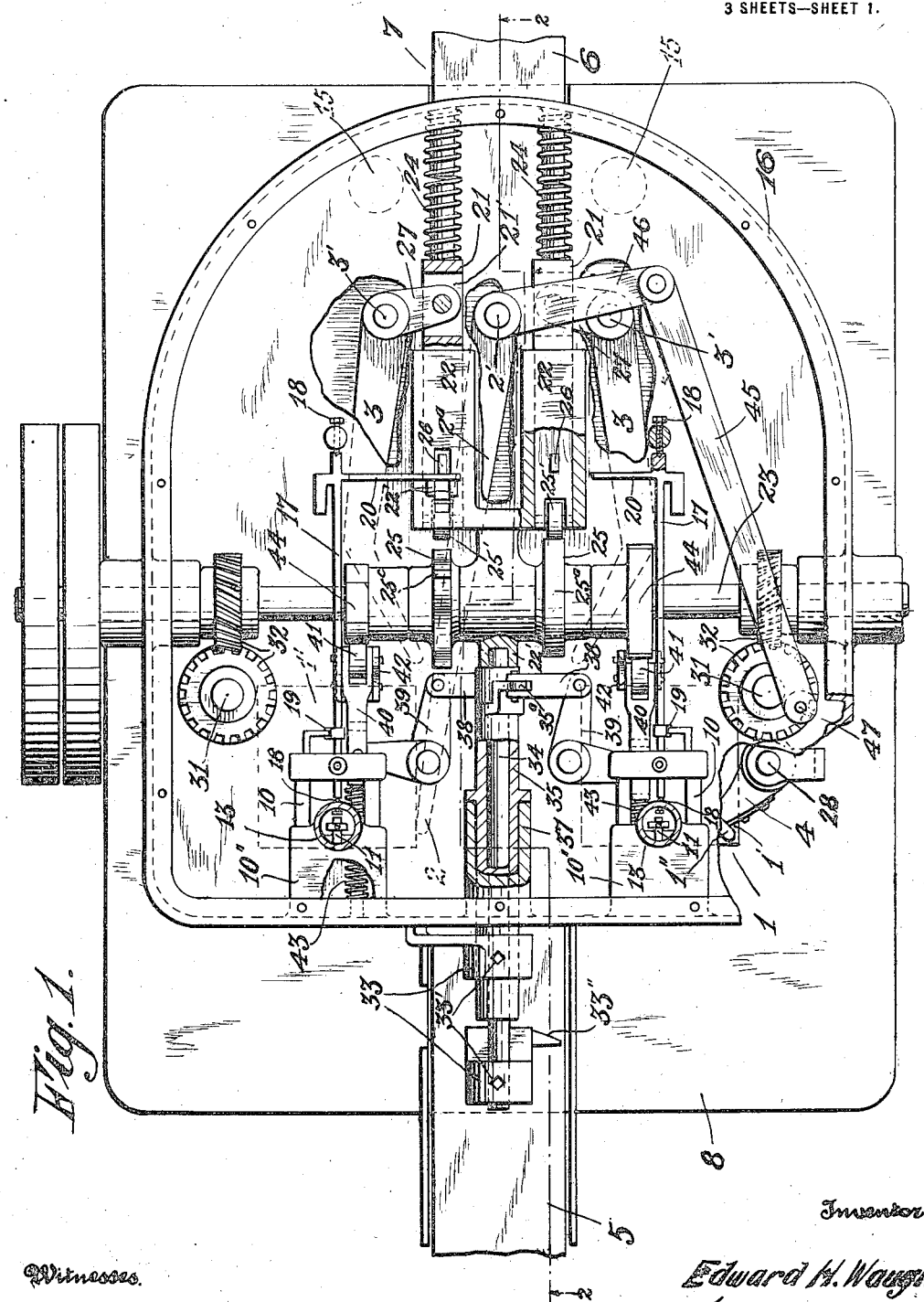

E. H. WAUGH.
WEIGHT TESTING MACHINE.
APPLICATION FILED DEC. 28, 1910.

1,137,936.

Patented May 4, 1915.
3 SHEETS—SHEET 1.

Witnesses.
James E. Sproll.
Arlita Adams.

Inventor
Edward H. Waugh.
By Adams & Brooks
Attorneys.

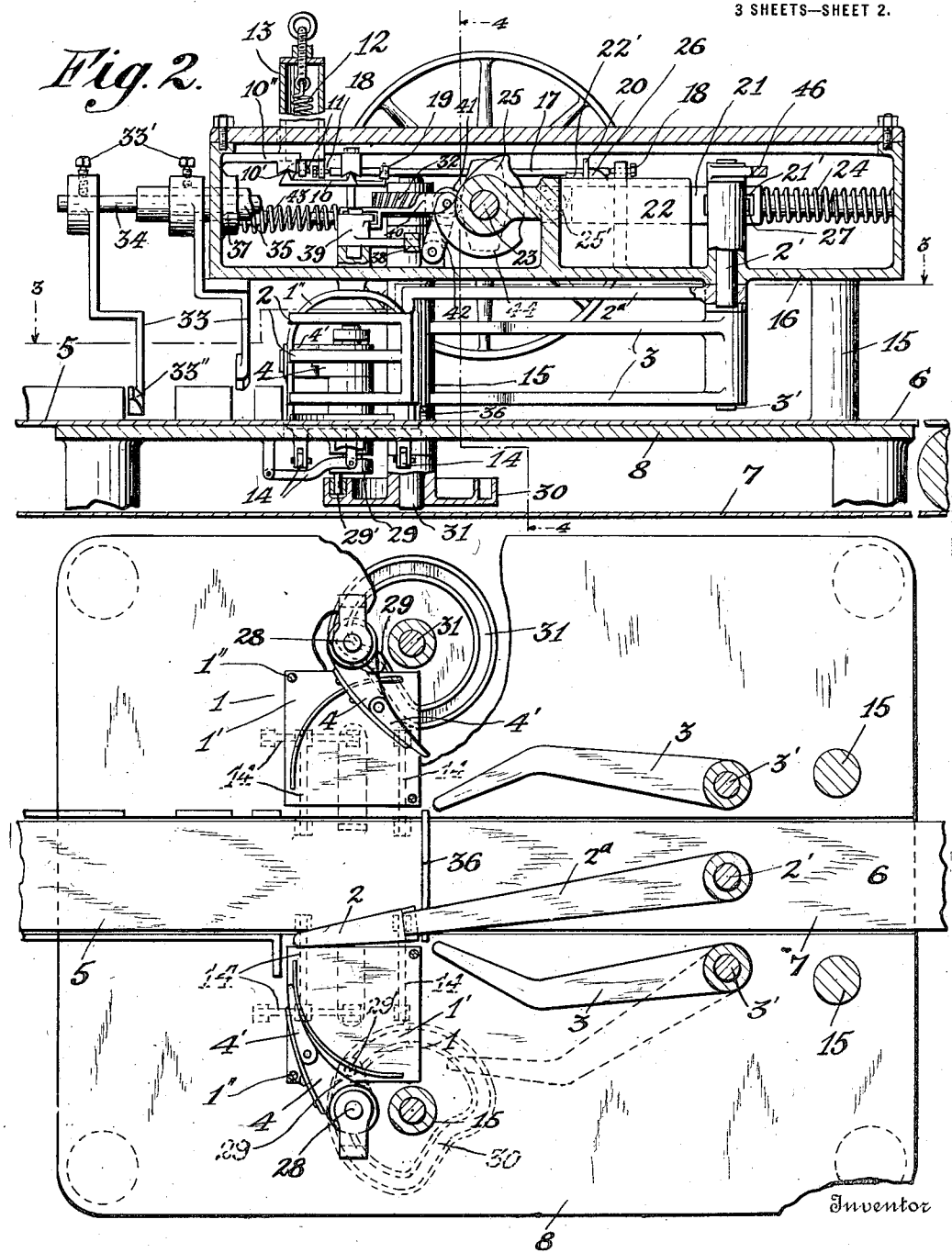

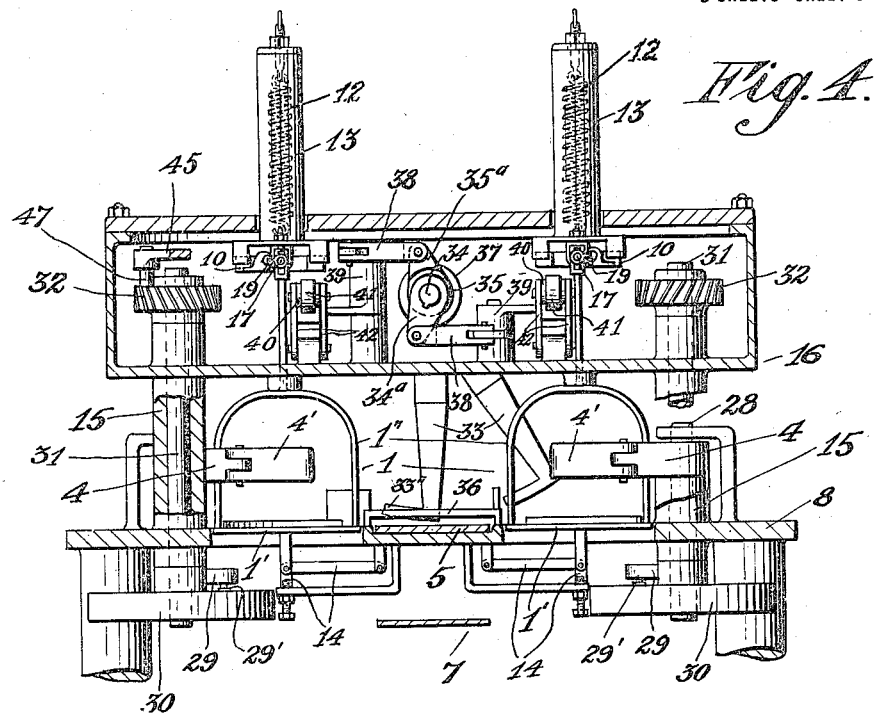
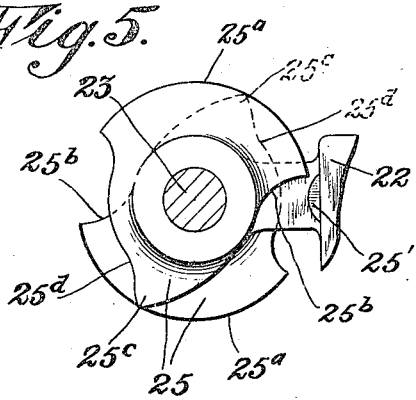
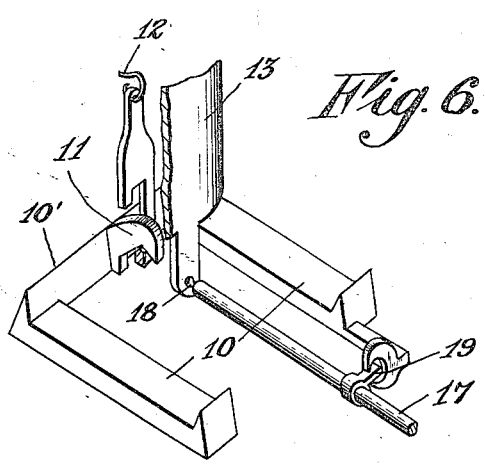

UNITED STATES PATENT OFFICE.

EDWARD H. WAUGH, OF SEATTLE, WASHINGTON, ASSIGNOR TO SMITH CANNERY MACHINES CO., OF SEATTLE, WASHINGTON, A CORPORATION OF WASHINGTON.

WEIGHT-TESTING MACHINE.

1,137,936.  Specification of Letters Patent.  Patented May 4, 1915.

Application filed December 28, 1910. Serial No. 599,729.

*To all whom it may concern:*

Be it known that I, EDWARD H. WAUGH, a citizen of the United States of America, and a resident of the city of Seattle, in the county of King and State of Washington, have invented certain new and useful Improvements in Weight-Testing Machines, of which the following is a specification.

My invention relates to machines of the above type, having more particular reference to apparatus for weighing canned goods, and has for a fundamental object the provision of novel constructions and arrangements of parts through which general efficiency is obtained. With this object in view the invention includes novel mechanisms for testing and assorting the tested cans, and further, in the weight testing devices being employed.

Further the invention consists in novel provisions for placing or depositing cans on testing means, and then shifting or ejecting said cans subsequently to the test.

With the above and other objects in view, to be referred to as my description progresses, my invention resides in the features of construction, arrangements and combinations of parts hereinafter described and succinctly defined in my annexed claims.

Referring to the accompanying drawings illustrating a preferred embodiment of my invention and wherein like numerals of reference indicate like parts throughout: Figure 1 is a top plan of my machine, parts being broken away. Fig. 2 is a longitudinal section taken on line 2—2 of Fig. 1, with portions broken away. Fig. 3 is a horizontal section taken on line 3—3 of Fig 2, with the placing or depositing device in its other position of adjustment and illustrating by broken lines one of the switches adjusted outwardly. Fig. 4 is a transverse section taken on line 4—4 of Fig. 2, the placing or depositing device being removed. Fig. 5 is a fragmentary detail view illustrating more particularly the controlling cams for the respective locking devices, and Fig. 6 is a fragmentary perspective illustrating more particularly the pivotal connection between a testing mechanism and associated rock shaft In carrying out my invention I provide suitable weight testing means conveniently comprising a pair of scales 1 with which is associated placing or depositing means, as 2, an assorting device comprising switches 3, and shifting or ejecting mechanism comprising devices 4, for the cans, the term "cans" being herein used for the sake of brevity.

Placing or depositing means 2 and switches 3 each comprise a plurality of forwardly projecting vertically spaced arms, fixed to the depending end portions of respective vertical shafts 2', 3', journaled in an upper frame section 16, the said arms of the said placing or depositing device forming branches of a main supporting arm 2ª and being arranged in advance of switches 3 and between scales 1.

In conjunction with the mechanism just set forth I have provided feed and delivery conveying means, indicated at 5 and 6 respectively, these conveniently comprising respective end portions of the upper run of an endless belt 7, the said upper run of this belt being seated in a longitudinally extending groove or way formed in the upper face of a base plate 8, which latter combined with the frame section 16, and suitable intermediate uprights 15, constitutes the main supporting frame of the machine.

Scales 1 have their platforms 1' arranged at the forward end portion of the base 8 on opposite sides of conveying means 5, across which latter the placing or depositing device 2 moves to feed to the scales alternately.

Devices 4, are each associated with a respective scale for movement across the face of its platform 1' to thereby remove the tested cans, the same throwing the latter against respective assorting switches 3 which control their direction of travel, the heavy cans or those of a predetermined or standard weight controlling said switches to adjust the same desirably outwardly to the position indicated in broken lines in Fig. 3, by which construction such cans are directed inwardly, by both switches, to the conveying means 6, while the "light" cans or those underweight are ejected from respective sides of the machine, by the switches with the latter standing in their normal positions.

These scales, and their respective related shifting and assorting devices while being controlled for alternate operation, are identical in construction, and therefore a description of one will suffice.

Platform 1' is suspended for vertical movement in a suitable opening of base plate 8 by a yoke 1'', said yoke being provided with a stem part extending through frame section 16 and pivotally connected with a scale beam 10 fulcrumed, as at 10', on a bracket 10'', and connected forwardly of its fulcrum, as by a hook extension 11, to a balance spring 12, preferably adjustably mounted in a housing 13, fixed to bracket 10''.

Reference numeral 14 indicates links pivotally connected to platform 1 and to base plate 8, for guiding said platform, as is well understood.

Reference numeral 17 indicates a rock shaft journaled on frame section 16, as by adjustable end bearings 18, in the form of screws, and pivotally connected at 19 to scale beam 10 to partake of its movement, the said rock shaft being provided at its opposite end portion with an arm 20, which through rotary adjustment of said rock shaft is movable to control the operation of switch actuator 21. Switch actuator 21 comprises a slide, mounted in a guide 22, consisting of a stand, for movement toward and from a drive shaft 23, a spring 24 tending to force said actuator toward said shaft and into the path of a suitable cam 25 thereof by which latter it is operated against the action of said spring 24.

To normally hold actuator 21 against movement I provide the same with an engaging part or jaw as for example a lug 26, which is adapted to engage arm 20, when the latter is in lowered or normal position. Through the action of spring 24, said actuator at such time holds said arm 20 against an abutment or jaw 22', to thereby lock the scale, said abutment or jaw comprising suitable shoulders provided on guide 22 and suitably spaced to permit of the free passage of jaw 26 therebetween. Motion of switch actuator 21 is transmitted to its switch 3, through the medium of a connection 27, comprising a crank arm fixed to shaft 3', and having its free end portion pivoted to actuator 21, as in a suitable slot 21' thereof.

Shifting device 4 which comprises an arm, preferably provided with a yieldingly held tip or free end portion 4', is fixed to a vertical oscillatory shaft 28, suitably journaled in base 8 at the outer side edge of scale platform 1' and provided on its lower end portion with a lever arm 29 having a follower 29' adapted for engagement with a cam 30, having a groove of unequal radii, as clearly shown in Figs. 2 and 3, to effect comparatively quick oscillations or strokes of shifter arm 4, followed by a pause of relatively long duration, during which pause or intermission depositing device 2 places a can on the scale platform 1', immediately following which cam 25 engages switch actuator 21 and forces the same slightly in a rearward direction conveniently through its throw portion 25$^a$ wiping an anti-friction roller 25' thereof, thereby freeing arm 20 so that it can be lifted out of the path of actuator 21, through lowering of the scale platform. Throw portion 25$^a$ is elongated, as shown, and consequently a comparatively long period is insured in which the operation of weighing a can can be performed.

Following cam surface portion 25$^a$ is a depression 25$^b$ which, when arm 20 is elevated permits of actuator 21 being projected forwardly, by spring 24, to adjust its switch 3 outwardly to guide the can, which will now be shifted from scale platform 1' by a rearward stroke of shifter 4, onto conveyer 6. Upon the scale 1 being thus relieved of the weight of the can, its spring 12 serves to return its parts and arm 20 to normal position, and as said arm 20 is lowered, a quick rearward movement of actuator 21, permits of said arm being again seated between jaws 22' and 26. This last named rearward movement of actuator 21 is effected by the cam raised portion 25$^c$, which latter is followed by a depression 25$^d$ which, extending to said raised portion 25$^a$ of the cam, insures, through arm 20 being firmly held, of the scale platform being locked during the positioning of a can thereon by device 2.

Cam 30 is fixed to the lower end portion of a vertically disposed shaft 31, which shaft is suitably journaled in base 8, and upper frame section 16 and connected, by suitable spiral gearing 32 to receive continuous rotary movement from drive shaft 23.

Reference numeral 33 indicates a check device for regulating the feed of the cans to the placing device 2, this comprising a pair of stops arranged one in advance of the other and releasably held, as by set screws 33', to permit of their adjustment toward one another as may be desired in operating with cans of different diameter, on rock shafts 34 and 35 respectively for movement across the conveyer 5 for alternate projection into the path of the cans, whereby upon the release of one can by the inner thereof, the other will hold the succeeding cans in check.

A guard 36 extending crosswise of endless belt 7 adjacent the rear edge portions of scale platform 1' prevents cans escaping device 2 and further, serves to guide the cans during their movement toward said scale platforms through the action of said device.

Stops 33 preferably have angular lower or foot portions and the forward end of the outer thereof is tapered to provide a cam surface 33″. By such construction, through suitably spacing stops 33, that is, to a distance slightly less than the diameter of the cams, the outer stop which advances immediately upon withdrawal or retraction of the inner stop, strikes the can with its foot, thereby starting the latter, and thus insuring regularity in the feed to device 2.

Shaft 35, which is hollow, is journaled in an elongated bearing 37 of frame section 16 and rotatably receives shaft 34, the latter having its inner end portion projecting beyond the former and journaled in an extension 22″ of stand 22, which also serves as an intermediate bearing for drive shaft 23.

For operating shafts 34 and 35 as described, I provide the same with lever arms 34ª and 35ª respectively, connected by links, as 38, with adjacent arms of respective bell crank levers 39. The other arms of these bell crank levers 39 are pivotally connected by links 40 with engaging devices 41, in the form of rollers, mounted in swingingly supported carriers 42 and yieldingly held by springs 43 in engagement with respective cams 44 on drive shaft 23.

Cams 44, which are substantially rectangular in form, to thereby effect two oscillations of their related rock shafts to one rotation of shaft 23 are set at substantially right angles to one another whereby they operate alternately.

Reference numeral 45 indicates a driving rod pivotally connected to a crank pin 47 of the spiral gear 32 of one shaft 31, and to an arm 46 of shaft 2′, by which power is transmitted from drive shaft 23 to the placing device 2 to oscillate the latter correlatively to movements of ejecting devices 4 to position a can for weighing subsequently to the retraction of an ejecting device.

Having thus described my invention, what I claim as new, and desire to secure by Letters Patent of the United States of America, is:

1. In a weight testing machine, companion weight testing mechanisms, means for feeding articles arranged between said testing mechanisms, a two-way feeding device for positioning the forwarded articles for testing, means for removing the articles from said testing mechanisms, and independent means each under control of a respective one of the testing mechanisms for directing tested articles of a predetermined class to a common point.

2. In a weight testing machine, a weight testing mechanism, pivotally supported means for ejecting the articles from said mechanism, means for advancing and retracting said ejecting means, directing means movable across the path of the ejected articles, and means controlled by said testing mechanism for operating said directing means.

3. In a weight testing machine, a weight testing mechanism, directing means disposed to one side of said mechanism, means controlled by said testing mechanism for operating said directing means, means mounted on a relatively fixed part for ejecting the articles from said testing mechanism against said directing means, and means for advancing and retracting said ejecting means.

4. In a weight testing machine, a weight testing mechanism, a delivery means, means movable across the path of the articles ejected from said mechanism for directing the same to said delivery means, means controlled by said testing mechanism for operating said directing means, pivotally supported means for ejecting the articles from said mechanism, and means for swinging said pivotally supported means to impel the tested articles against said article directing means.

5. In a weight testing machine, spaced weight testing mechanisms, means for feeding to said mechanisms alternately, a common delivery means, ejector means for ejecting the articles from said testing mechanisms, and means controlled from said testing mechanisms for deflecting the ejected articles to said delivery means.

6. In a weight testing machine, spaced weight testing mechanisms, means for feeding to said mechanisms alternately, a delivery means, ejector means for ejecting the articles from said testing mechanisms, means for operating said ejector means alternately, and independently movable means controlled from respective testing mechanisms for directing the ejected articles to said delivery means.

7. In a weight testing machine, companion weight testing mechanisms, means for feeding articles to said mechanisms alternately for testing, means for ejecting the tested articles from said testing mechanisms, means for directing articles ejected from each testing mechanism movable across the path of ejection, and means under control of said weight testing mechanisms for operating said directing means.

8. In a weight testing machine, companion weight testing mechanisms, a conveyer, means for feeding articles from said conveyer to said mechanisms alternately, a check device pivotally supported for movement in a plane perpendicular to said conveyer for holding the articles conveyed in check, and means for operating said check device and said feeding means alternately.

9. In a weight testing machine, a weight testing mechanism, means for feeding articles to said testing mechanism, means for controlling the feed of the articles by said first means comprising a pair of oscillatory check members supported one in advance of the other with their axes lengthwise of the path of feed for alternate projection into the path of the articles being fed, and means for advancing said check members alternately.

10. In a weight testing machine, a weight testing mechanism, means for feeding articles to said testing mechanism, means for controlling the feed of the articles by said first means comprising a pair of check members arranged one in advance of the other for alternate projection into the path of the articles being fed, a pair of rock shafts extending lengthwise of the path of feed each carrying one of said check members, and means for rocking said shafts.

11. In a weight testing machine, a weight testing mechanism, means for feeding articles to said testing mechanism, oscillatory supports over said feeding means, a pair of check members arranged one in advance of the other, and each mounted on a support, one of said check members being adjustably mounted for movement toward and from the other check member, and means for rocking said supports to simultaneously retract one of said check members and advance the other.

12. In a weight testing machine, a weight testing mechanism, means for feeding articles to said testing mechanism, oscillatory supports over said feeding means, a pair of check members arranged one in advance of the other, and each mounted on a support, one of said check members being adjustably mounted for movement toward and from the other check member, and means for rocking said supports to simultaneously retract one of said check members and advance the other, the outer of said check devices having its lower portion formed with a cam face portion arranged to engage an article during advance movement of the check device, for the purpose specified.

13. In a weight testing machine, a weight testing mechanism, a locking device for holding said mechanism against operation including a bodily slidable gripping member, an opposing gripping member a spring normally pressing said gripping member for operation of the latter, and means for shifting said gripping member periodically against the action of said spring to release said testing mechanism for operation.

14. In a weight testing machine, a weight testing mechanism including a receiving platform, a movable locking member, means engaged by said locking member for holding said mechanism against operation, means for shifting said locking member periodically, and a connection between said first means and said testing mechanism for effecting the withdrawal of said first means from the path of said locking member upon lowering of the platform of said testing mechanism.

15. In a weight testing machine, a weight testing mechanism including a receiving platform, a movable locking member, means engaged by said locking member for holding said mechanism against operation, means for shifting said locking member periodically, a connection between said first means and said testing mechanism for effecting the withdrawal of the said first means from the path of said locking member upon lowering of the platform of said testing mechanism, means for ejecting articles from the platform of said testing mechanism, and a directing means movable across the path of ejection of the articles connected to said locking member for actuation thereby.

16. In a weight testing machine, a weight testing mechanism including a receiving platform, a movable locking member, means engaged by said locking member for holding said mechanism against operation, resilient means for actuating said locking member in one direction, means for shifting said locking member periodically in the reverse direction, a connection between said first means and said mechanism for effecting the withdrawal of the said first means from the path of said locking member upon lowering of the platform of said testing mechanism.

17. In a weight testing machine, a weight testing mechanism, a pair of jaws, means supporting one of said jaws for movement past the other, a yielding means tending to force said first means in the said last named direction, a member normally engaged between said jaws connected for movement from such position by said testing mechanism, and means for moving said movable jaw periodically against the action of said yielding means.

18. In a weight testing machine, a weight testing mechanism, a pair of jaws, means supporting one of said jaws for movement past the other, yielding means tending to force said first means in the said last named direction, a member normally engaged between said jaws connected for movement from such position by said testing mechanism, and means for moving said movable jaw periodically against the action of said yielding means.

19. In a weight testing machine, a weight testing mechanism, a pair of jaws, means supporting one of said jaws for movement past the other, yielding means tending to force said first means in the said last named direction, a member normally engaged between said jaws connected for movement from such position by said testing mechanism, means for moving said movable jaw periodically against the action of said yielding means, means for ejecting the articles from said testing mechanism, and a directing means connected with said first means for movement thereby across the path of delivery of the tested articles.

20. In a weight testing machine, weight testing mechanisms, means for removing tested articles from said mechanisms alternately, a delivery means, and independent means each associated with a respective weight testing mechanism and controlled thereby for operation independently of the other and in time with said first means for directing tested articles to said delivery means.

21. In a weight testing machine, companion weight testing mechanisms, means for feeding articles to said mechanisms alternately, means for removing tested articles from said mechanisms, independently movable means for directing articles removed from said mechanisms toward a common point, and means connecting each of said independently movable means with a respective one of said mechanisms to be controlled thereby in its operation.

22. In a weight testing machine, companion weight testing mechanisms, means for removing tested articles from said mechanisms, a delivery means, and a directing means for each weight testing mechanism controlled thereby for directing ejected articles to said delivery means.

23. In a weight testing machine, companion weight testing mechanisms, means for feeding articles to said mechanisms, means for removing tested articles from said mechanisms alternately, and oppositely disposed independently movable directing means each under control of its respective weight testing mechanism for directing ejected articles.

24. In a weight testing machine, companion weight-testing mechanisms, means for transferring tested articles therefrom including independently movable guiding devices, means controlled by the respective testing mechanisms for operating the transferring means to cause the same to deliver to a common point articles of a like class with respect to weight, and means for alternately operating said transferring means whereby they will deliver in an alternating manner to such common point.

Signed at Seattle, Washington, this 16 day of December, 1910.

EDWARD H. WAUGH.

Witnesses:
ARLITA ADAMS,
ERNESTINE DESILETS.